(12) United States Patent
Shimizu et al.

(10) Patent No.: US 12,459,098 B2
(45) Date of Patent: Nov. 4, 2025

(54) DEVICE

(71) Applicant: MAX CO., LTD., Tokyo (JP)

(72) Inventors: Toshio Shimizu, Tokyo (JP); Kiichi Haramiishi, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 17/873,896

(22) Filed: Jul. 26, 2022

(65) Prior Publication Data
US 2023/0033175 A1 Feb. 2, 2023

(30) Foreign Application Priority Data

Jul. 30, 2021 (JP) ................. 2021-126174

(51) Int. Cl.
*B25C 5/02* (2006.01)
*B25C 5/13* (2006.01)
*F16H 57/04* (2010.01)

(52) U.S. Cl.
CPC ......... *B25C 5/0285* (2013.01); *F16H 57/043* (2013.01); *B25C 5/13* (2013.01)

(58) Field of Classification Search
CPC ................ B25C 5/0285; B25C 5/13
See application file for complete search history.

(56) References Cited

U.S. PATENT DOCUMENTS

| | | | | |
|---|---|---|---|---|
| 1,298,234 A * | 3/1919 | Lowther | ............... | F16J 1/08 92/159 |
| 2,475,669 A * | 7/1949 | Lawson | ............... | A43D 69/04 12/11.2 |
| 3,096,749 A * | 7/1963 | Davidson | ............... | F01L 1/181 74/519 |
| 4,430,783 A * | 2/1984 | Wherry | ............... | F01L 1/185 228/173.6 |
| 6,419,049 B1 * | 7/2002 | Joo | ............... | F16C 33/1065 384/123 |
| 7,165,709 B2 * | 1/2007 | Yagi | ............... | B27F 7/36 227/155 |
| 7,681,770 B2 * | 3/2010 | Kanai | ............... | B27F 7/19 227/8 |
| 8,261,957 B2 * | 9/2012 | Yagi | ............... | B27F 7/19 227/140 |
| 8,905,285 B2 * | 12/2014 | Sugihara | ............... | B27F 7/21 227/129 |

(Continued)

FOREIGN PATENT DOCUMENTS

| | | |
|---|---|---|
| CN | 110131385 A | 8/2019 |
| CN | 112253616 A | 1/2021 |

(Continued)

OTHER PUBLICATIONS

Extended European Search Report dated Dec. 23, 2022, issued by the European Patent Office in the corresponding European Patent Application No. 22186928.2. (9 pages).

*Primary Examiner* — Thomas M Wittenschlaeger
*Assistant Examiner* — Katie L Gerth
(74) *Attorney, Agent, or Firm* — Banner & Witcoff, Ltd.

(57) ABSTRACT

A device includes a first member having a first surface, and a second member having a second surface that is partially or wholly in contact with the first surface. The first member and the second member are configured to operate relatively. The first member has a flow path of a lubricant that has an opening provided in the first surface.

8 Claims, 12 Drawing Sheets

(56) References Cited

U.S. PATENT DOCUMENTS

| | | | |
|---|---|---|---|
| 9,162,368 B2* | 10/2015 | Kameda | B27F 7/19 |
| 9,738,007 B2* | 8/2017 | Shimamura | B27F 7/19 |
| 10,245,873 B2* | 4/2019 | Kenjo | B42B 5/00 |
| 2002/0020379 A1 | 2/2002 | Seader et al. | |
| 2002/0104514 A1* | 8/2002 | Mori | F04B 1/0404 |
| | | | 123/495 |
| 2009/0301418 A1* | 12/2009 | Arinaga | F01L 13/0021 |
| | | | 123/90.34 |
| 2009/0320243 A1* | 12/2009 | Wang | G06F 1/1616 |
| | | | 16/303 |
| 2009/0320245 A1* | 12/2009 | Wang | G06F 1/1616 |
| | | | 16/374 |
| 2010/0071156 A1* | 3/2010 | Wang | G06F 1/1616 |
| | | | 16/303 |
| 2010/0101053 A1* | 4/2010 | Li | G06F 1/1681 |
| | | | 16/319 |
| 2010/0107369 A1* | 5/2010 | Li | G06F 1/1616 |
| | | | 16/374 |
| 2013/0142463 A1* | 6/2013 | Gaumer | F16C 33/1065 |
| | | | 384/145 |
| 2014/0239648 A1 | 8/2014 | Riedel | |
| 2015/0159523 A1* | 6/2015 | Kawakami | F01M 9/10 |
| | | | 123/90.15 |
| 2016/0185149 A1* | 6/2016 | Kenjo | G03G 15/6544 |
| | | | 412/33 |
| 2017/0204974 A1* | 7/2017 | Ruffin | F16J 15/182 |
| 2019/0338711 A1* | 11/2019 | Choi | F02B 75/044 |
| 2022/0111503 A1* | 4/2022 | Kikai | B25C 5/11 |
| 2022/0241948 A1* | 8/2022 | Baba | B25C 1/06 |
| 2022/0412403 A1* | 12/2022 | Voisine | F16C 23/045 |

FOREIGN PATENT DOCUMENTS

| | | |
|---|---|---|
| DE | 4304418 A1 | 8/1994 |
| EP | 3912764 A1 | 11/2021 |
| JP | S54-039764 A | 3/1979 |
| JP | S59-174496 U | 11/1984 |
| JP | 2011-214328 A | 10/2011 |
| JP | 2014-533782 A | 12/2014 |
| JP | 6272148 B2 | 1/2018 |
| WO | 2020/149235 A1 | 7/2020 |

* cited by examiner

DEVICE

CROSS-REFERENCE TO RELATED APPLICATIONS

The present application claims priority from Japanese Patent Application No. 2021-126174 filed on Jul. 30, 2021, the entire content of which is incorporated herein by reference.

TECHNICAL FIELD

The disclosure relates to a device including two members that move in contact with each other by relative movement.

BACKGROUND ART

In a device provided with, for example, a cam mechanism, a gear mechanism, a hinge mechanism or the like, which is configured by two members (first member and second member) that move in contact with each other by relative movement, lubricant such as grease may be applied to a sliding surface in order to improve the slidability and durability of the sliding surface (contact surface) of two members. Further, a technique has been proposed in which a grease storing recess for storing grease is provided on the sliding surface of at least one of the first member and the second member so that the grease can be supplied from the grease reserving recess to the sliding surface (e.g., see Japanese Unexamined Patent Publication No. 2011-214328).

Further, in a hinge mechanism provided with a shaft that serves as a rotating axis of a rotating member and a bracket having a cylindrical portion that wraps around an outer periphery of the shaft and obtains sliding resistance by an elastic force, a technique has been proposed in which a groove-shaped grease storing hole inclined with respect to a rotation direction of the shaft penetrates in the cylindrical portion (e.g., see Japanese Patent No. 6272148).

SUMMARY OF INVENTION

However, in the technique where a grease storage is formed by providing a recess or a through hole on a sliding surface of a member, there is a problem that the volume of the grease storage must be increased and a sufficient amount of grease must be held or accommodated so that the grease is not exhausted during repeated sliding. However, when the size of the grease storage is enlarged, the area of the sliding surface is reduced. Therefore, the surface pressure increases and wear is promoted. Further, this leads to a decrease in the strength of the sliding surface.

Therefore, the disclosure provides a device which suppresses the depletion of the lubricant on the sliding surface while suppressing a decrease in the area of the surface where the two members are in contact with each other, that is, the area of the sliding surface.

According to an aspect of the present invention, there is provided a device including a first member having a first surface, and a second member having a second surface that is partially or wholly in contact with the first surface. The first member and the second member are configured to operate relatively. The first member has a flow path of a lubricant that has an opening provided in the first surface.

In the device, the lubricant is supplied from the opening to the first surface of the first member in contact with the second surface of the second member through the flow path.

According to the above-described device, since the lubricant can be held or accommodated in the flow path, it is not necessary to enlarge the opening of the first surface, and it is possible to suppress a decrease in the area of the sliding surface. Further, since a required amount of lubricant can be held in the flow path, the depletion of the lubricant can be suppressed.

DESCRIPTION OF EMBODIMENTS

Hereinafter, embodiments of the device of the disclosure will be described with reference to the drawings.

<Example of the Embodiment of the Device of the Disclosure>

Figure 1A:
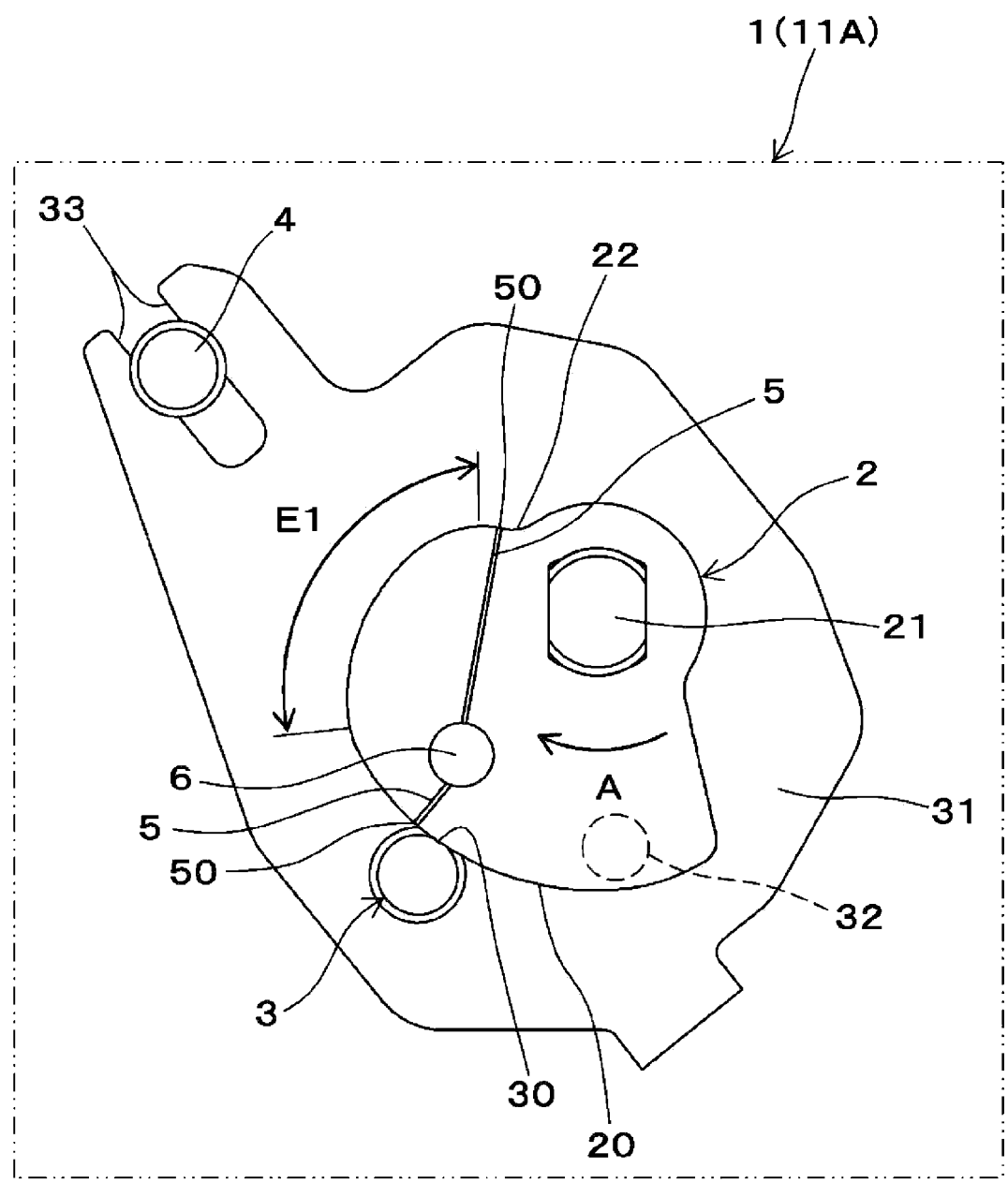
FIG. 1A is a side view of a main part showing an example of a stapler as an embodiment of the device of the disclosure.
Figure 1B:
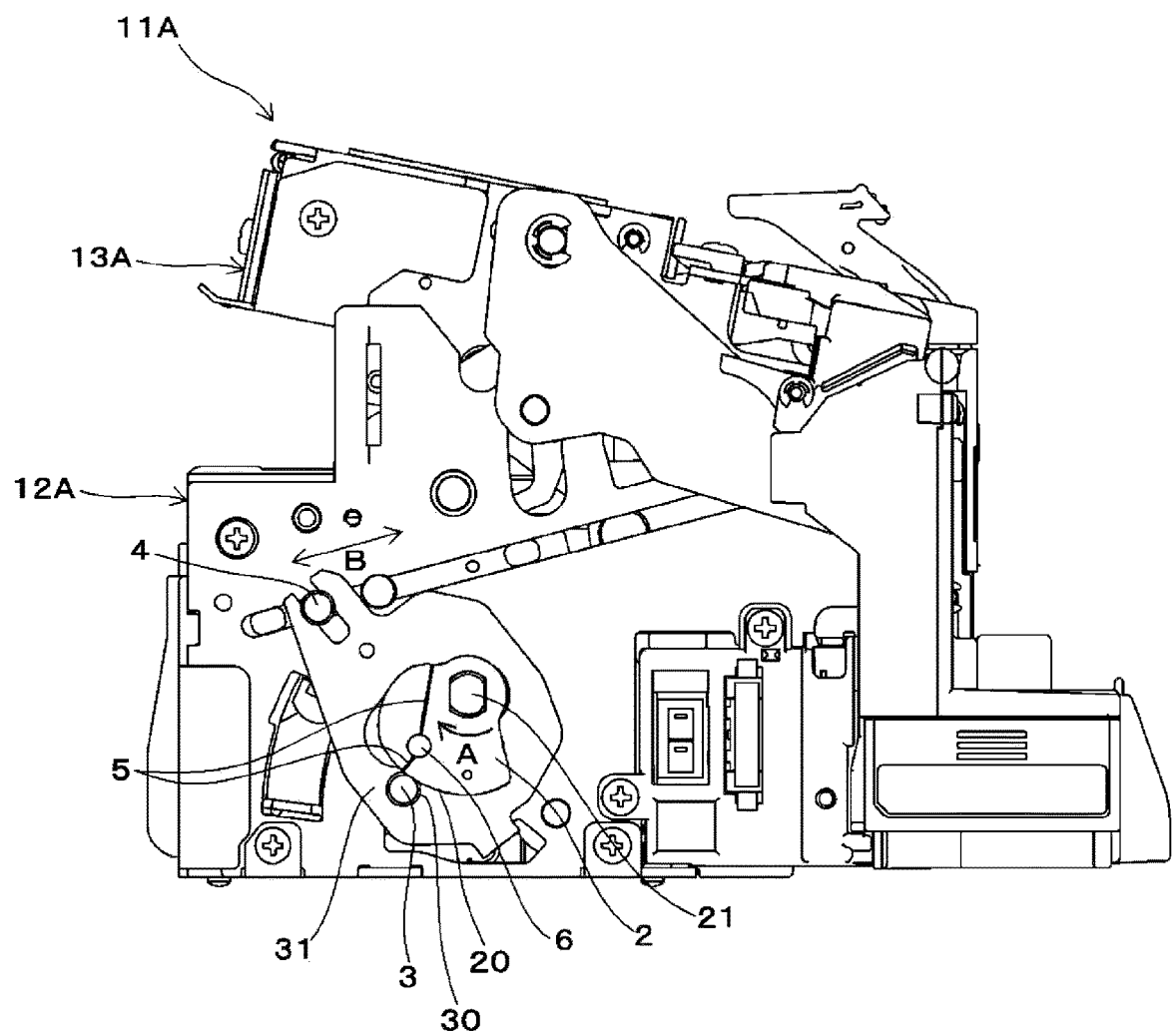
FIG. 1B is a side view showing the example of the stapler as the embodiment of the device of the disclosure.
Figure 2A:
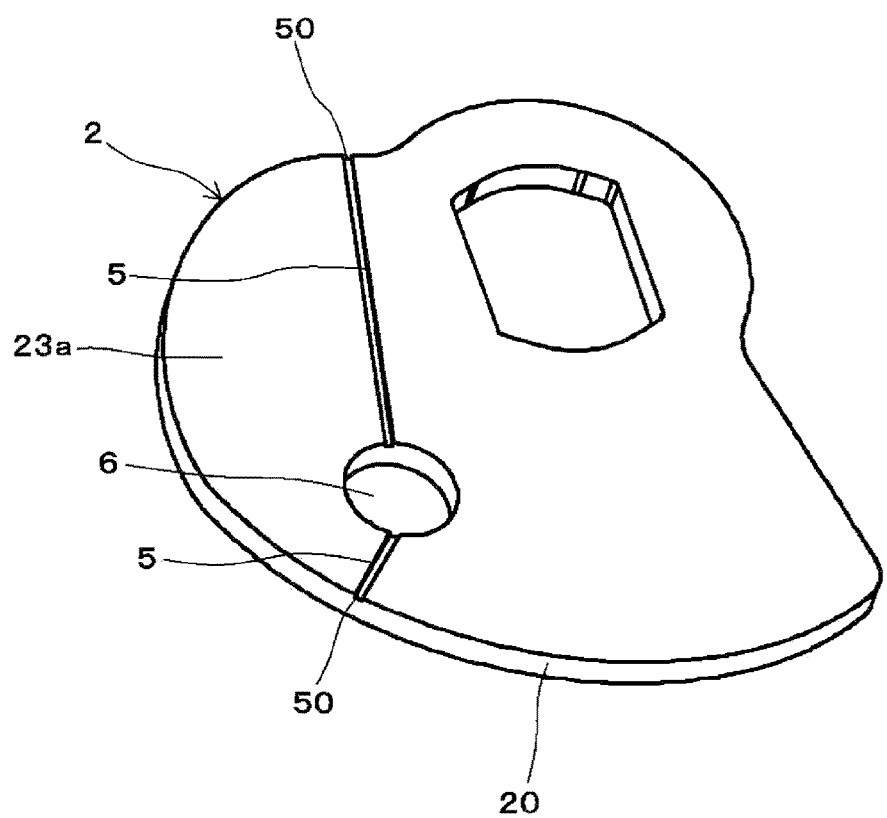
FIG. 2A is a perspective view showing an example of a first member constituting the stapler of the present embodiment.
Figure 2B:
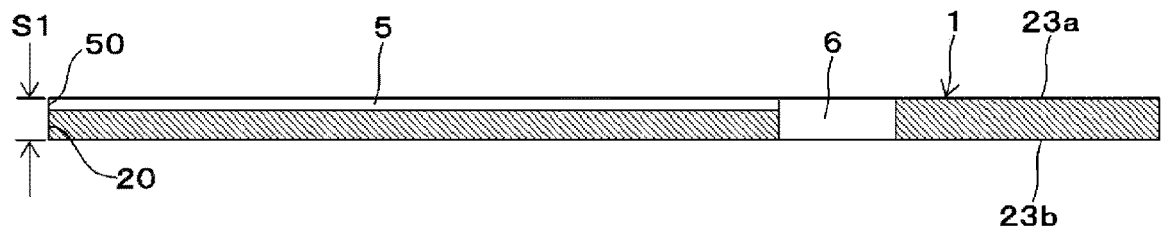
FIG. 2B is a sectional view showing the example of the first member constituting the stapler of the present embodiment.

FIG. 1A is a side view of a main part showing an example of a stapler as an embodiment of the device of the disclosure, and FIG. 1B is a side view showing the example of the stapler as the embodiment of the device of the disclosure. Further, FIG. 2A is a perspective view showing an example of a first member constituting the stapler of the present embodiment, and FIG. 2B is a sectional view showing the example of the first member constituting the stapler of the present embodiment.

In this example, a device 1 shown in FIG. 1A is a stapler 11A shown in FIG. 1B, and includes a first member 2 having a first surface 20 and a second member 3 having a second surface 30 that is partially or wholly in contact with the first surface 20.

The first member 2 is configured by a flat plate-shaped cam, and the first surface 20 is configured by a cam surface having a predetermined shape formed on an outer periphery of the first member 2. The second member 3 is a cam follower that follows the cam surface and is configured by a columnar shaft. The second surface 30 is configured by an outer peripheral surface of the second member 3.

The first member 2 and the second member 3 are configured to operate (move) relatively. The first member 2 rotates about a shaft 21 as a fulcrum.

The second member 3 is provided on an operating member 31. In this example, the second member 3 is provided integrally with the operating member 31. The operating member 31 is a plate-shaped member and rotates about a shaft 32 as a fulcrum.

The second member 3 is provided at a position at a predetermined distance from the shaft 32, and projects from the operating member 31 in a direction parallel to the shaft 32. In this way, the second member 3 moves on an arc whose radius is the distance from the shaft 32 to the second member 3 by a rotational operation of the operating member 31 with the shaft 32 as a fulcrum.

The shaft 21 of the first member 2 and the shaft 32 of the operating member 31 are not provided coaxially. Further, the second member 3 is not provided coaxially with the shaft 21 of the first member 2. In this way, the second member 3 is configured to be movable in a radial direction of the rotational operation of the first member 2 with the shaft 21 as a fulcrum by the rotational operation of the operating member 31 with the shaft 32 as a fulcrum.

Further, the second member 3 is urged in a direction in which the second surface 30 is pressed against the first surface 20. And, when the first member 2 rotates about the shaft 21 as a fulcrum, the second member 3 in which the second surface 30 slides along the first surface 20 moves following the shape of the first surface 20.

The operating member 31 is provided with an acting portion 33 that exerts a force on a workpiece 4 at a position at a predetermined distance from the shaft 32. As the first member 2 rotates about the shaft 21 as a fulcrum, and the second member 3 moves following the shape of the first surface 20, the operating member 31 rotates about the shaft 32 as a fulcrum. When the operating member 31 rotates, the acting portion 33 moves on an arc whose radius is the distance from the shaft 32 to the acting portion 33, and operates the workpiece 4.

The first member 2 has a flow path 5 that holds lubricant such as grease and allows the lubricant to pass through. The flow path 5 is provided on a surface different from the first surface 20 in the flat plate-shaped first member 2. Specifically, the flow path 5 is configured by a concave groove that is provided on a front surface 23a, which is one surface of the front and back surfaces of the first member 2, and does not penetrate to a back surface 23b, which is the other surface. The front and back surfaces of the first member 2 are surfaces that are continuous with the first surface 20 and substantially orthogonal to the first surface 20.

One end side of the flow path 5 is an opening 50 opened in the first surface 20, and the lubricant held in the flow path 5 can flow out from the opening 50 to a sliding surface. The opening 50 is provided in a part of the first surface 20 in a thickness direction of the first member 2 indicated by an arrow S1. The thickness direction of the first member 2 is a direction intersecting with a direction in which the first member 2 and the second member 3 operate relatively.

Lubricant is supplied from the opening 50 to the first surface 20 of the first member 2 on which the second surface 30 of the second member 3 slides through the flow path 5. In this way, the wear of the first surface 20 of the first member 2 and the second surface of the second member 3 is suppressed. Further, since the flow path 5 is provided on, for example, the front surface 23a of the first member 2 other than the first surface 20, the length, width, depth, and the like of the flow path 5 can be set relatively freely. Therefore, the flow path capable of holding the required amount of lubricant can be easily formed. In this manner, since the required amount of lubricant can be held in the flow path 5, it is not necessary to form a large opening or recess in the sliding surface, that is, the first surface 20, whereby the reduction in the area of the sliding surface can be suppressed. Furthermore, when a sufficient amount of lubricant can be held in the flow path 5, the lubricant can be supplied from the flow path 5 to the opening 50 without interruption even if the sliding is repeated, so that the depletion of the lubricant on the sliding surface is suppressed.

In the first member 2, the first surface 20 is provided with a changing point 22 that changes in a direction in which the distance from a portion of the first surface 20 with which the second member 3 comes into contact to the shaft 21 increases when the first member 2 rotates about the shaft 21 as a fulcrum in a direction of an arrow A.

When the first member 2 rotates in the direction of the arrow A, and the portion of the first surface 20 with which the second member 3 comes into contact passes through the changing point 22, the load applied to the first surface 20 and the second surface 30 increases. When the load applied to the first surface 20 and the second surface 30 increases, the first surface 20 and the second surface 30 are likely to be worn.

Therefore, the opening 50 may be provided on the upstream side of the portion where the load is most applied in the range where the first surface 20 and the second surface 30 are in contact with each other when the first member 2 and the second member 3 operate relatively. In this example, the opening 50 is provided on the downstream side of the changing point 22 and on the upstream side (the upstream side in the direction in which an area where the first surface 20 and the second surface 30 are in contact with each other transits when the first member 2 and the second member 3 operate relatively) of a range E1 where the load can be most applied in the range of the first surface 20 with which the second member 3 comes into contact in the operation in which the first member 2 rotates about the shaft 21 as a fulcrum in the direction of the arrow A.

In this way, lubricant can be supplied to the portions where the first surface 20 and the second surface 30 are likely to be worn, so that the wear can be further suppressed.

The first member 2 may include a plurality of flow paths 5. In each of the flow paths 5, a plurality of openings 50 corresponding to the plurality of flow paths 5 are provided at different portions of the first surface 20 in the range where the first surface 20 and the second surface 30 are in contact with each other when the first member 2 and the second member 3 operate relatively.

The first member 2 may include an accommodating portion 6 that communicates with the flow path 5 and accommodates the lubricant supplied to the flow path 5. The accommodating portion 6 is provided at a surface different from the first surface 20 in the flat plate-shaped first member 2. In this example, the accommodating portion 6 is configured by providing a hole penetrating from the front surface 23a to the back surface 23b of the first member 2. Although the volume of the accommodating portion 6 is configured to be equal to or larger than the volume of the flow path 5 in this example, the volume of the accommodating portion 6 does not necessarily to be equal to or larger than the volume of the flow path 5. In a configuration where the plurality of flow paths 5 are provided, each flow path 5 communicates with the accommodating portion 6. Meanwhile, the accommodating portion 6 may be configured by providing a bottomed hole (recess) that does not penetrate to the back surface 23b on the front surface 23a of the first member 2. Although two flow paths 5 and one accommodating portion 6 connected to the two flow paths 5 are provided in the example shown in FIG. 2A, the accommodating portion 6 may be provided in each of the plurality of flow paths 5 (for example, two accommodating portions 6 for two flow paths 5).

The first member 2 rotates about the shaft 21 as a fulcrum, and the second surface 30 of the second member 3 moves following the shape of the first surface 20, so that the operating member 31 rotates about the shaft 32 as a fulcrum. As a result, the first member 2 and the second member 3 operate relatively. The accommodating portion 6 is provided at a portion where the load applied to the first member 2 is low when the first member 2 and the second member 3 operate relatively. That is, the accommodating portion 6 is provided outside the range defined by the lines connecting a portion (E1) where the load applied to the first member 2 is highest and the shaft 21.

The stapler 11A includes an ejection unit 12A for supplying a staple (not shown) and ejecting the staple to a bundle of paper, and a binding unit 13A for cutting and bending staple legs of the staple ejected by the ejection unit 12A.

In the stapler 11A, a shaft of a motor (not shown) and the first member 2 are connected, and the first member 2 rotates about the shaft 21 as a fulcrum in the direction of the arrow A. When the first member 2 rotates about the shaft 21 as a fulcrum, the second member 3 in which the second surface 30 rubs along the first surface 20 moves following the shape of the first surface 20. Further, when the first member 2 makes one rotation about the shaft 21 as a fulcrum in the direction of the arrow A, the operating member 31 provided with the second member 3 swings, and the workpiece 4 reciprocates in a direction of an arrow B. Since the operating member 31 is urged by a spring (not shown) in a direction of being abutted against the first member 2, the second member 3 moves following the shape of the first surface 20.

As the operation of the workpiece 4 is transmitted via a link or the like, the binding unit 13A moves in a direction separating from or approaching the ejection unit 12A. When, by the operation of rotating the first member 2 about the shaft 21 as a fulcrum in the direction of the arrow A, the second member 3 moves following the shape of the first surface 20, the operating member 31 provided with the second member 3 swings, and the workpiece 4 reciprocates in the direction of the arrow B, the binding unit 13A moves in a direction approaching the ejection unit 12A, and a bundle of paper is pinched between the binding unit 13A and the ejection unit 12A. Further, by the operation of further rotating the first member 2 about the shaft 21 as a fulcrum in the direction of the arrow A, the binding unit 13A moves in a direction separating from the ejection unit 12A, and the pinching of the bundle of paper is released.

Further, after the bundle of paper is pinched between the binding unit 13A and the ejection unit 12A, in the ejection unit 12A, by the operation of rotating the shaft 21 in the direction of the arrow A, the operation is transmitted to a driver (not shown) via a link or the like, and the staple legs of the staple are penetrated through the bundle of paper. Furthermore, in the binding unit 13A, by the operation of rotating the shaft 21 in the direction of the arrow A, the operation is transmitted to a clincher (not shown) via a link or the like, and the staple legs of the staple penetrating the bundle of paper are bent.

In the stapler 11A, the operation of binding the bundle of paper is executed by the operation of rotating the first member 2 that is a cam once in the direction of the arrow A.

As the second surface 30 slides along the first surface 20 of the first member 2, the second member 3 that is a cam follow moves following the shape of the first surface 20.

Lubricant is supplied from the opening 50 to the first surface 20 of the first member 2 on which the second surface 30 of the second member 3 slides through the flow path 5. In this way, the wear of the first surface 20 of the first member 2 and the second surface of the second member 3 is suppressed.

The opening 50 of the flow path 5 is provided in a part of the first surface 20 in the thickness direction of the first member 2. In this way, even when the first member 2 has a plate shape, the decrease in strength due to the provision of the opening 50 is suppressed. In the stapler 11A, it is required to suppress the plate thickness of the first member 2 for the purpose of miniaturization. Even in such a case, the decrease in strength due to the provision of the opening 50 in the first surface 20 is suppressed. On the other hand, when the flow path 5 is provided on one surface of the first member 2, for example, the front surface 23a, it is not necessary to make the area of the opening 50 exposed on the first surface 20 larger than necessary. Therefore, the lubricant can be stored while suppressing an increase in the plate thickness and a decrease in strength of the first member 2. Meanwhile, although, in this example, the plate thickness of the first member 2 along the direction indicated by the arrow S1 in FIG. 2B is 1.2 mm whereas the depth of the opening 50 along the same direction is 0.1 mm and the width thereof is 0.3 mm, the disclosure is not limited to these dimensions.

Further, the accommodating portion 6 is provided on the front surface 23a of the first member 2. The lubricant on the sliding surface acts in a direction of decreasing from the sliding surface due to repeated sliding. At this time, the lubricant held in the accommodating portion 6 and the flow path 5 is supplied (replenished) to the sliding surface via the opening 50. Therefore, the accommodating portion 6 accommodates an amount of lubricant that is not exhausted on the sliding surface. In this example, the volume of the accommodating portion 6 is configured to be equal to or larger than the volume of the flow path 5, so that the depletion of lubricant is suppressed for a long period of time. Furthermore, since the accommodating portion 6 is provided at a portion where the load applied to the first member 2 is low when the first member 2 and the second member 3 operate relatively, the decrease in strength due to the provision of the accommodating portion 6 is suppressed. The lubricant in the accommodating portion 6 may be supplied to the sliding surface by surface tension.

As the operating member 31 rotates about the shaft 32 shown in FIG. 1A as a fulcrum, the portion of the second member 3 where the second surface 30 and the first surface 20 are in contact with each other changes. When the lubricant is consumed in the vicinity of the portion where the load is most applied in the range where the first surface 20 and the second surface 30 are in contact with each other when the first member 2 and the second member 3 operate relatively, there is a possibility that the wear of the portion of the second surface 30 in contact with the first surface 20 at the portion where the load is most applied progresses.

Therefore, when the opening 50 is provided on the upstream side of the portion where the load is applied, the consumption of the lubricant at the portion where the load is applied is suppressed, and the wear of the portion of the second surface 30 in contact with the first surface 20 at the portion where the load is most applied is suppressed.

<Modified Example of First Member>

FIGS. 3A to 3F are perspective views showing modified examples of the first member, and illustrate other embodiments of the flow path and the accommodating portion.

Figure 3A:
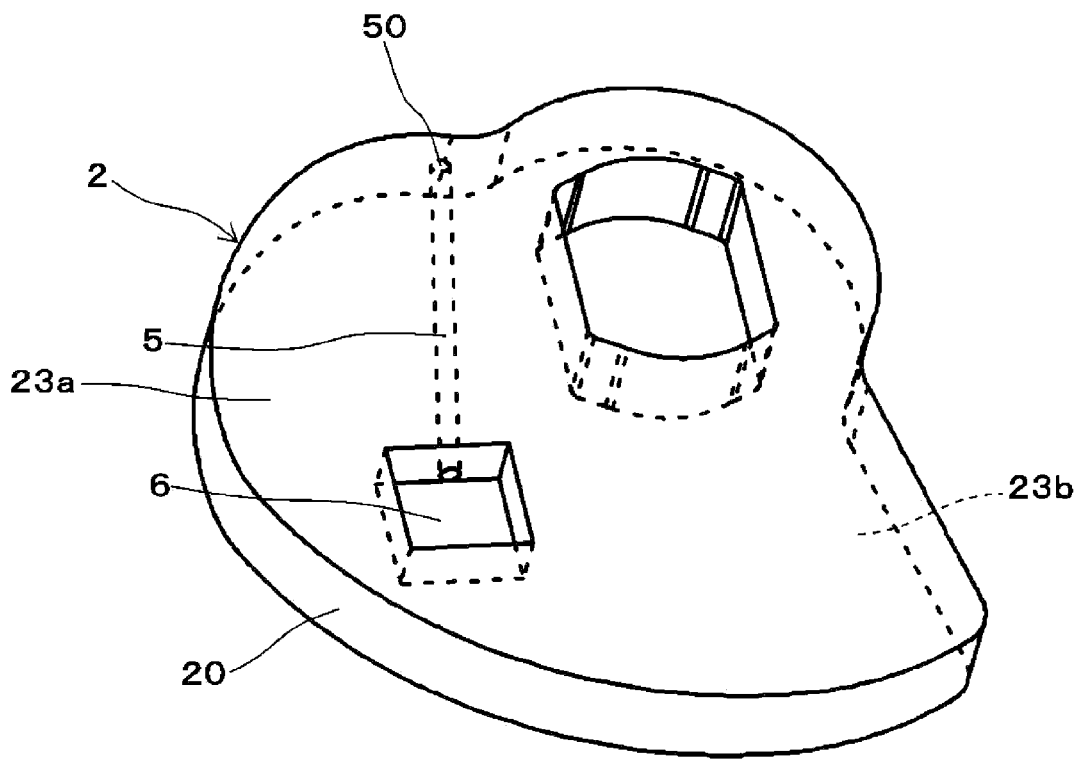
FIG. 3A is a perspective view showing a modified example of the first member.

As shown in FIG. 3A, the flow path 5 may be provided inside the first member 2 without being exposed to the front surface 23a and the back surface 23b of the first member 2, and communicate with the opening 50 provided on the first surface 20. Further, the accommodating portion 6 is a bottomed recess that communicates with the flow path 5, has a bottom portion formed on the back surface 23b of the first member 2, and is exposed to the front surface 23a. Here, the accommodating portion 6 may be provided inside the first member 2 without being exposed to the front surface 23a and the back surface 23b.

Figure 3B:
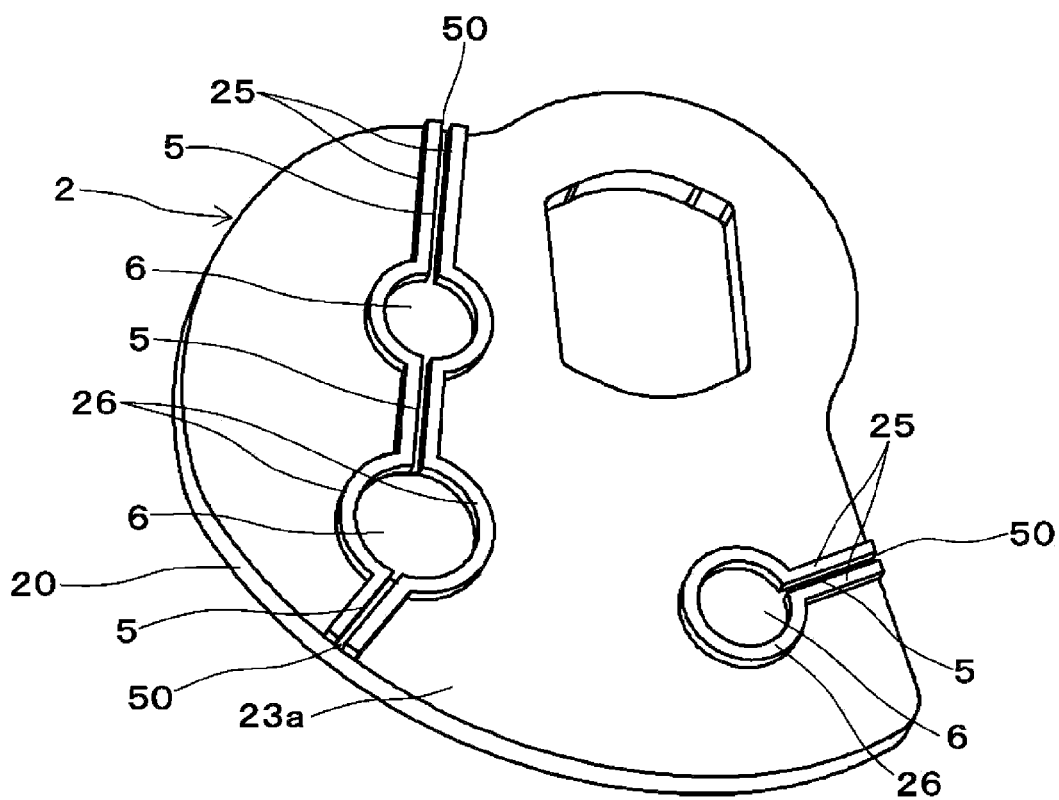
FIG. 3B is a perspective view showing a modified example of the first member.

Furthermore, rather than forming the flow path 5 by cutting out the front surface 23a and the back surface 23b of the first member 2 in a recessed shape or forming the flow path 5 inside the first member 2, the flow path 5 may include a pair of flow path forming convex portions 25 provided at a predetermined interval on the front surface 23a of the first member 2 and may be configured by a recess between the flow path forming convex portions 25, as shown in FIG. 3B. Further, the accommodating portion 6 may include a pair of accommodating portion forming convex portions 26 provided on the front surface 23a of the first member 2 and communicating with the flow path forming convex portions 25 and may be configured by a recess between the accommodating portion forming convex portions 26 communicating with the flow path 5. The accommodating portion 6 may be provided at a plurality of locations, and the flow path 5 may communicate between the plurality of accommodating portions 6.

Figure 3C:
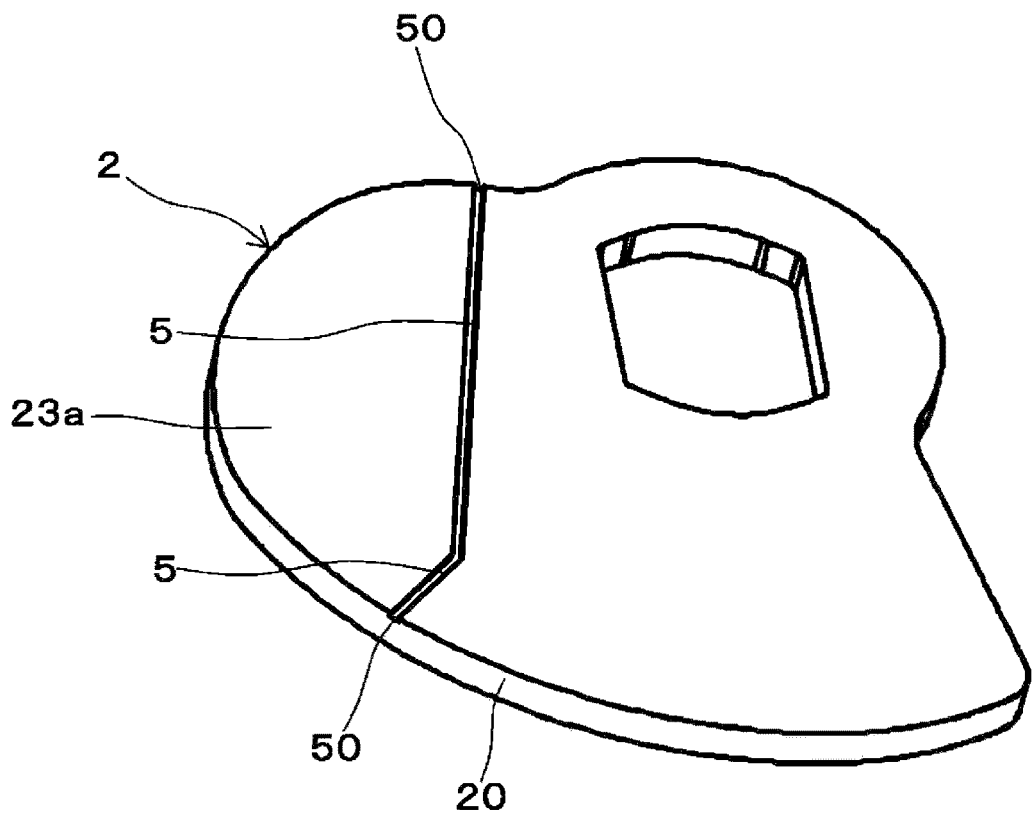
FIG. 3C is a perspective view showing a modified example of the first member.
Figure 3D:
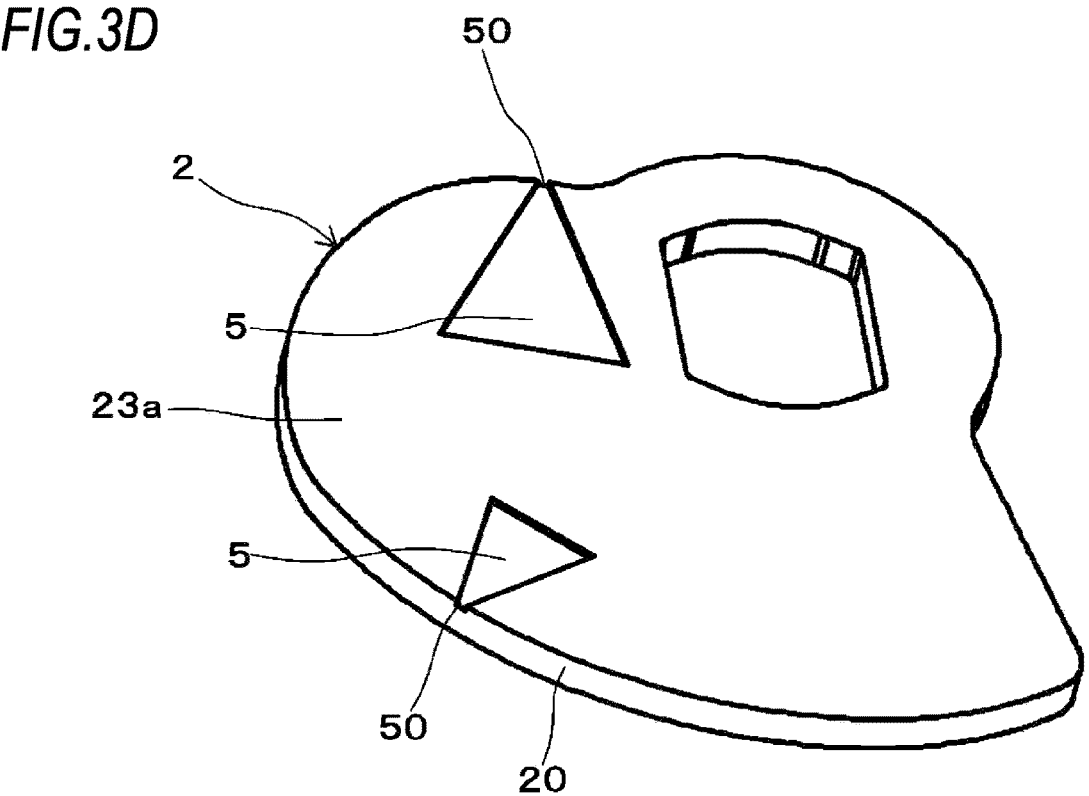
FIG. 3D is a perspective view showing a modified example of the first member.

As shown in FIG. 3C, rather than providing the accommodating portion 6, the flow path 5 may also serve as an accommodating portion. Further, as shown in FIG. 3D, the flow path 5 may be increased in volume by widening the width along the front surface 23a of the first member 2 away from the opening 50, so that the amount of lubricant stored may be increased. In the example shown in FIG. 3D, it can also be considered that the flow path 5 serves as an accommodating portion.

Figure 3E:
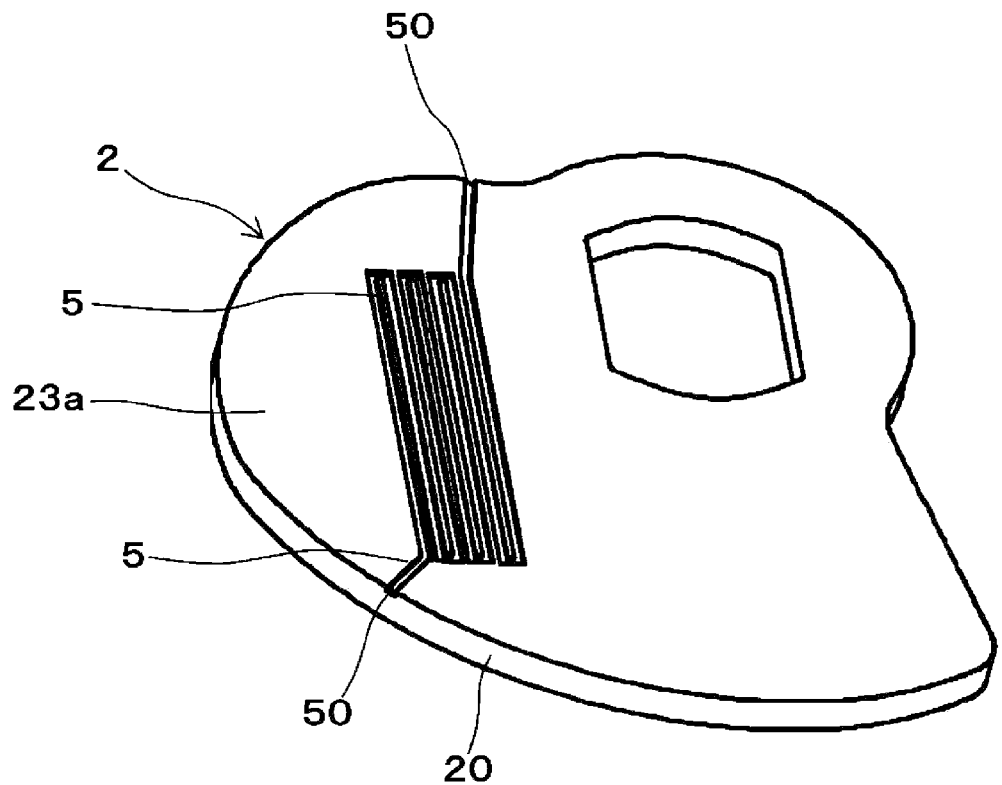
FIG. 3E is a perspective view showing a modified example of the first member.
Figure 3F:
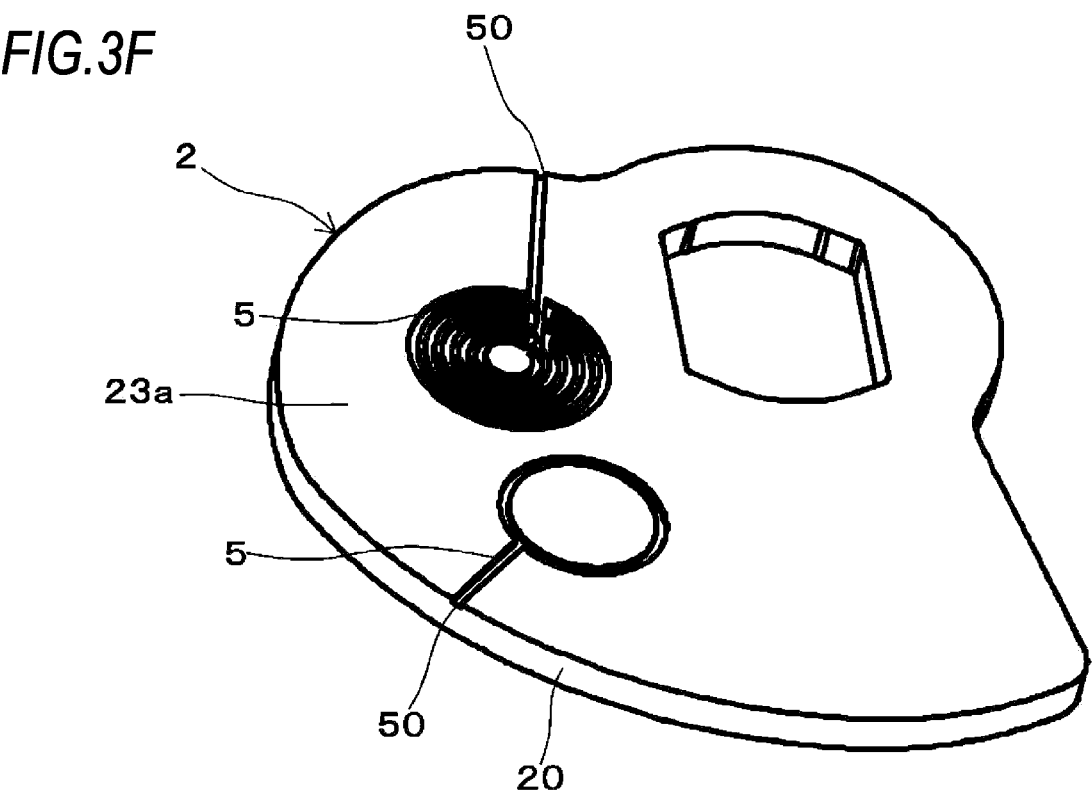
FIG. 3F is a perspective view showing a modified example of the first member.

Furthermore, in order to extend the length of the flow path 5 so that the amount of lubricant stored can be increased, the linear flow path 5 may be folded back at a plurality of locations as shown in FIG. 3E, or the flow path 5 may be annular or spiral as shown in FIG. 3F.

<Examples of Other Embodiments of Device of Disclosure>

Figure 4A:
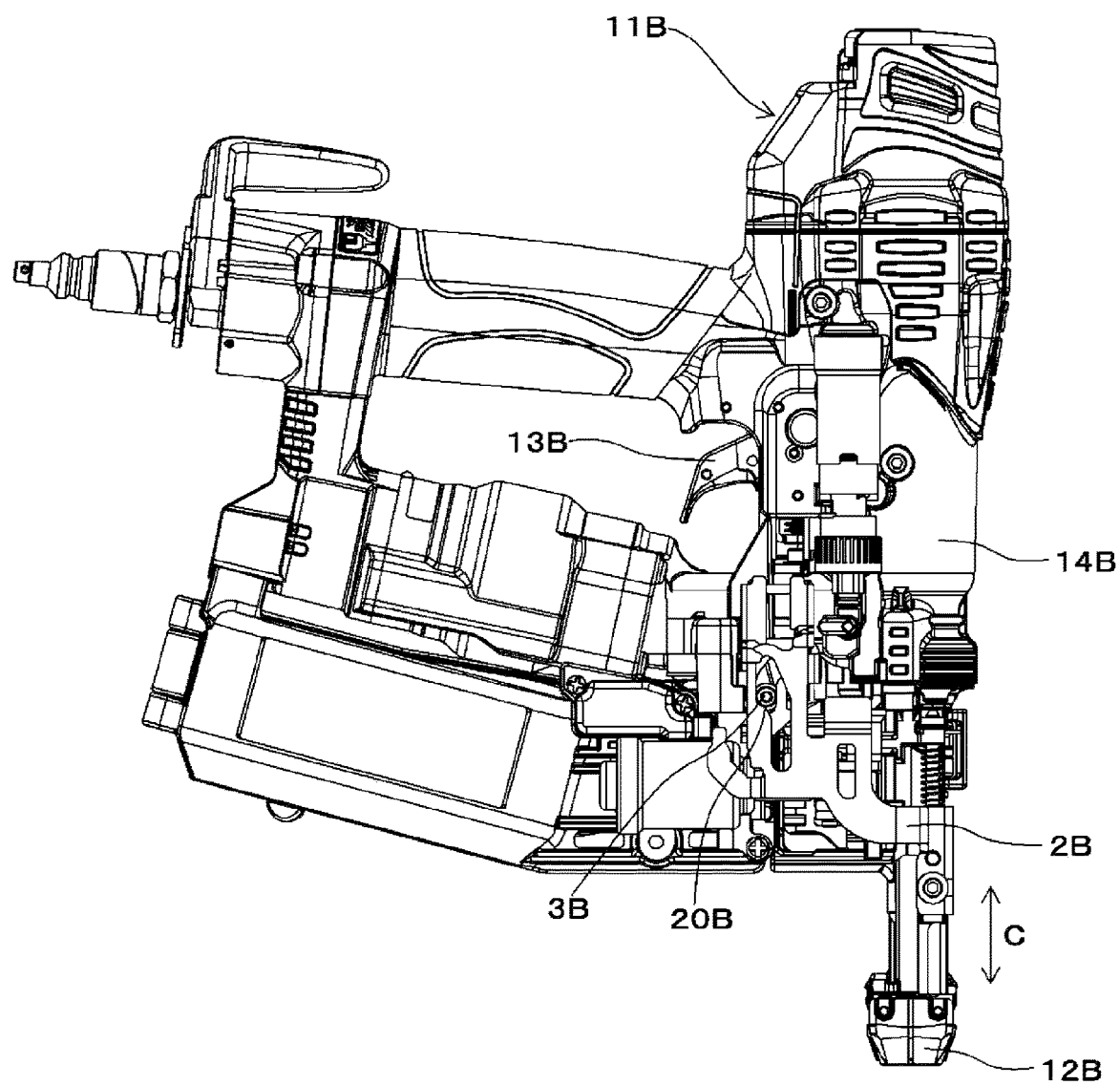
FIG. 4A is a side view showing an example of an internal configuration of a driving tool as an embodiment of the device of the disclosure.
Figure 4B:
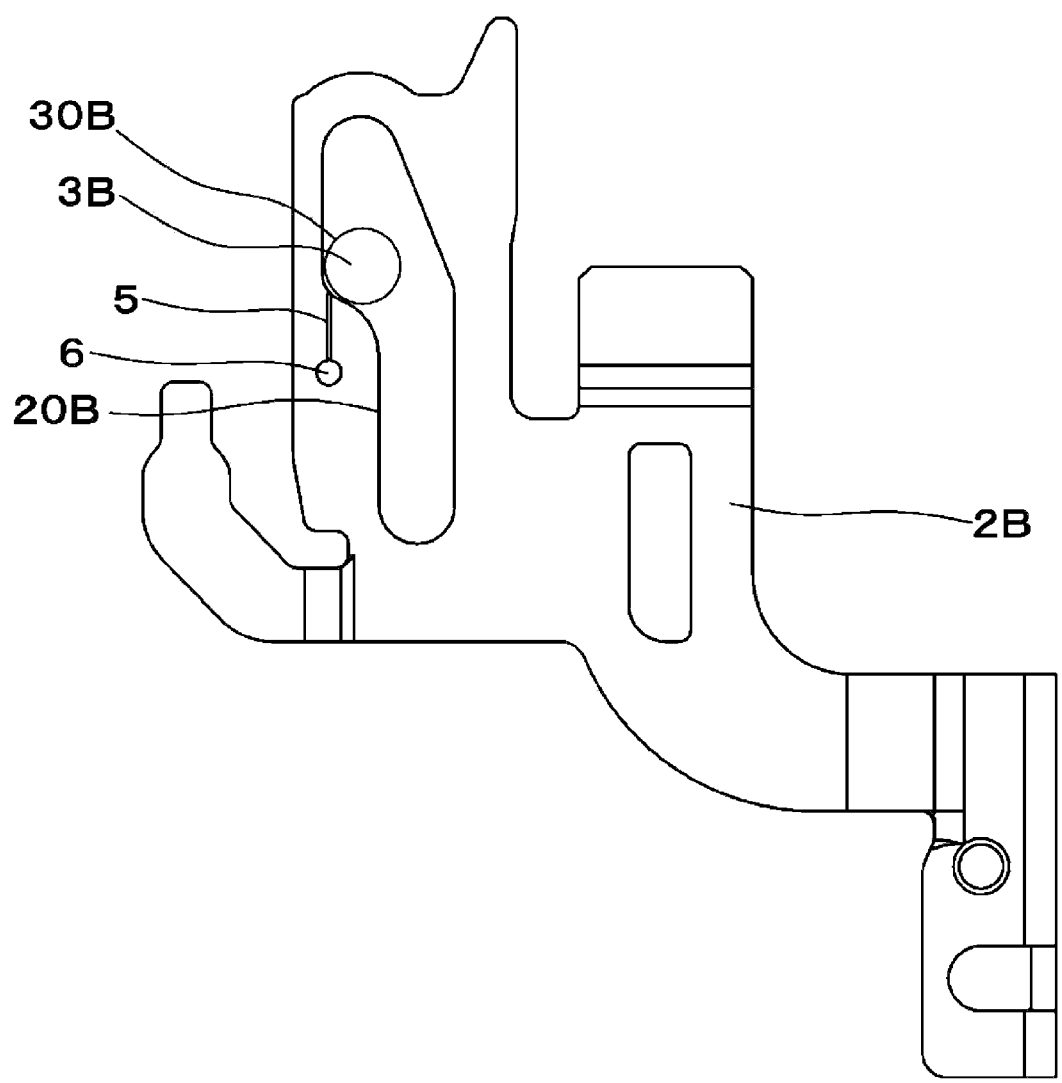
FIG. 4B is a side view showing an example of a contact arm as a first member constituting the driving tool.

FIG. 4A is a side view showing an example of an internal configuration of a driving tool as an embodiment of the device of the disclosure, and FIG. 4B is a side view showing an example of a contact arm as a first member constituting the driving tool. A driving tool 11B is a device for driving consumables such as staples (not shown) into an object to be driven by air pressure of compressed air or the like.

The driving tool 11B is actuated by detecting the movement of a contact arm 2B operated by a contact member 12B being pressed against a workpiece to be driven and the movement of a trigger 13B operated by an operator.

The contact arm 2B is attached to a main body 14B to be able to reciprocate in a direction indicated by an arrow C. The contact arm 2B constitutes the first member and includes a cam surface 20B constituting the first surface. Further, the contact arm 2B includes the lubricant flow path 5 communicating with the cam surface 20B, and the lubricant accommodating portion 6 communicating with the flow path 5.

The driving tool 11B includes a cam follower 3B that moves following the cam surface 20B of the contact arm 2B. The cam follower 3B is an example of the second member, and a second surface 30B in contact with the cam surface 20B is formed on an outer periphery of a cylindrical shape of the cam follower 3B.

In the driving tool 11B, when the contact member 12B is pressed against a workpiece to be driven and the contact arm 2B moves in the direction of the arrow C, the cam surface 20B and the cam follower 3B rub against each other. And, when the cam follower 3B moves following the shape of the cam surface 20B, a switch (not shown) is actuated.

In the contact arm 2B, lubricant is supplied to the cam surface 20B on which the cam follower 3B rubs through the flow path 5. As a result, the wear of the cam surface 20B of the contact arm 2B and the cam follower 3B is suppressed.

Figure 5A:
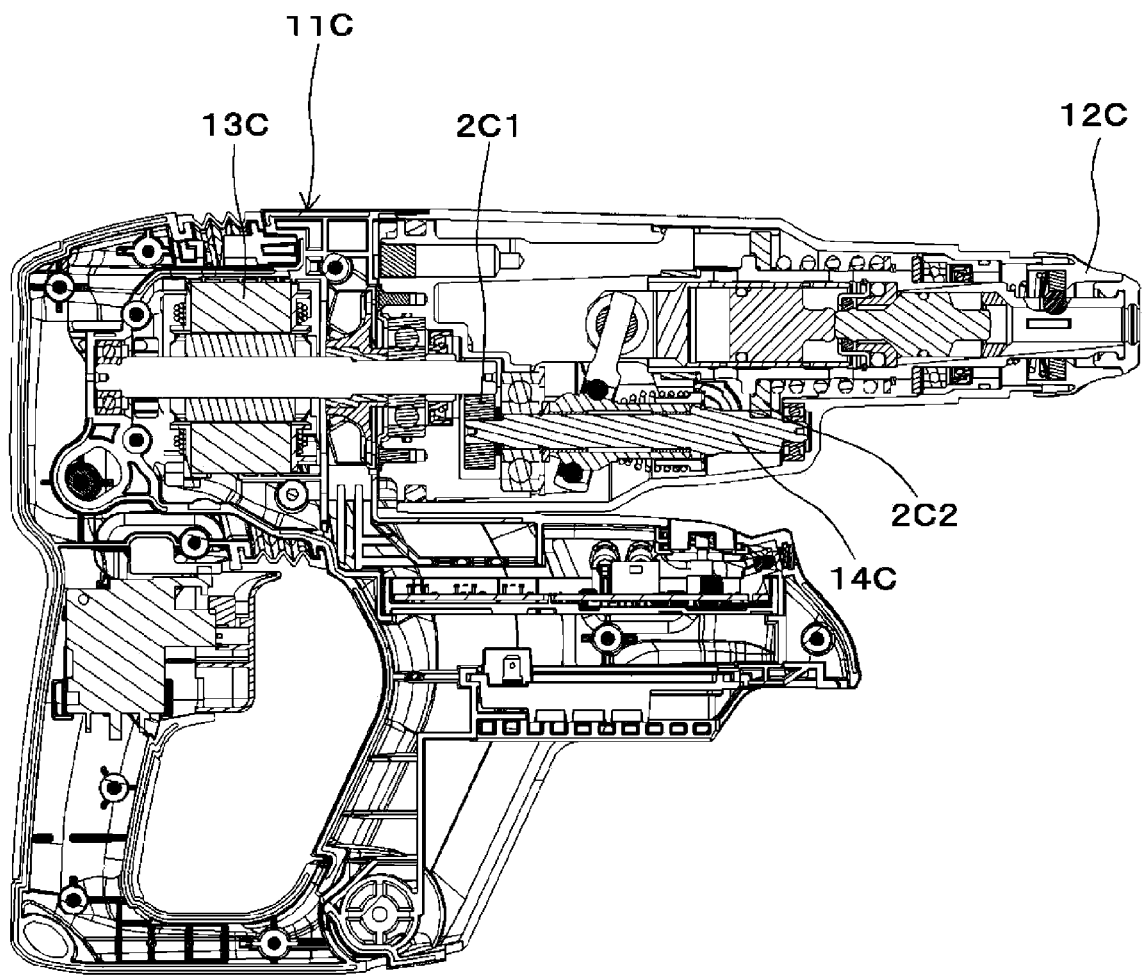
FIG. 5A is a side sectional view showing an example of an internal configuration of a drill tool as an embodiment of the device of the disclosure.
Figure 5B:
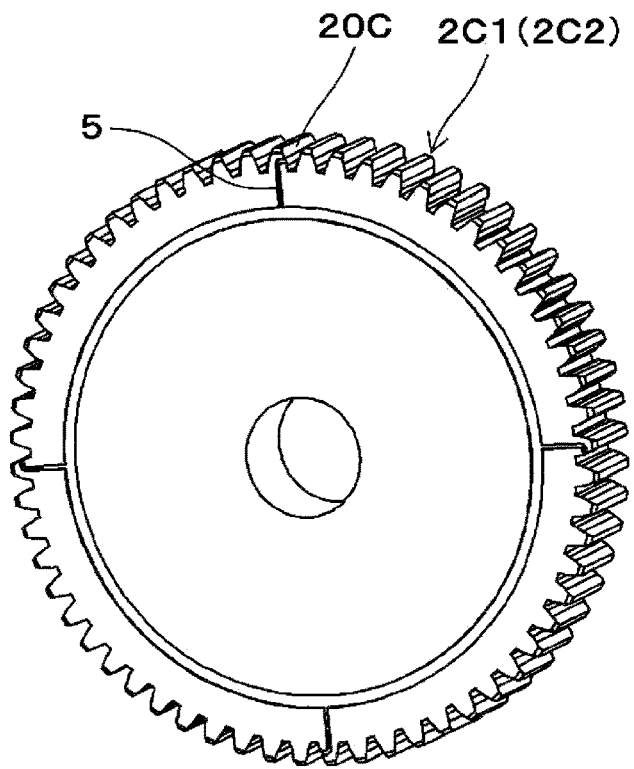
FIG. 5B is an overall perspective view showing an example of a gear as a first member constituting the drill tool.
Figure 5C:
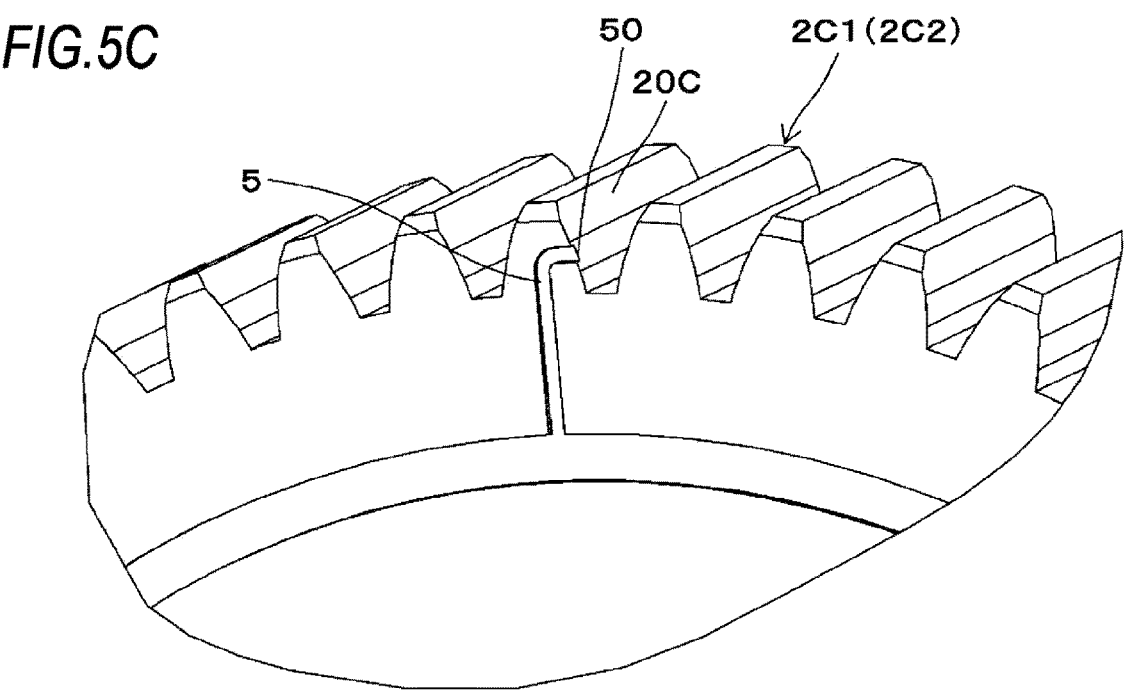
FIG. 5C is a perspective view of a main part showing an example of the gear as the first member constituting the drill tool.

FIG. 5A is a side sectional view showing an example of an internal configuration of a drill tool as an embodiment of the device of the disclosure, FIG. 5B is an overall perspective view showing an example of a gear as the first member constituting the drill tool, and FIG. 5C is a perspective view of a main part showing an example of the gear as the first member constituting the drill tool. A drill tool 11C is a device for drilling a hole in an object by rotating and vibrating a rotating body 12C such as a drill chuck to which a drill (not shown) can be removably attached with a driving force of a motor 13C.

The drill tool 11C includes a shaft 14C to which a driving force of the motor 13C is transmitted through a first gear 2C1, and a second gear 2C2 which transmits the driving force of the motor 13C to the rotating body 12C via the shaft 14C.

The first gear 2C1 and the second gear 2C2 constitute the first member and include a teeth portion 20C constituting the first surface. One or both of the first gear 2C1 and the second gear 2C2 include the lubricant flow path 5 that communicates with the teeth portion 20C via the opening 50. In the drill tool 11C, the second member is configured by a gear that meshes with the first gear 2C1, and the second member is configured by a gear that meshes with the second gear 2C2.

In the first gear 2C1 and the second gear 2C2, lubricant is supplied to the teeth portion 20C where the gears mesh with each other via the flow path 5. In this way, the wear of the teeth portion 20C is suppressed.

Figure 6A:
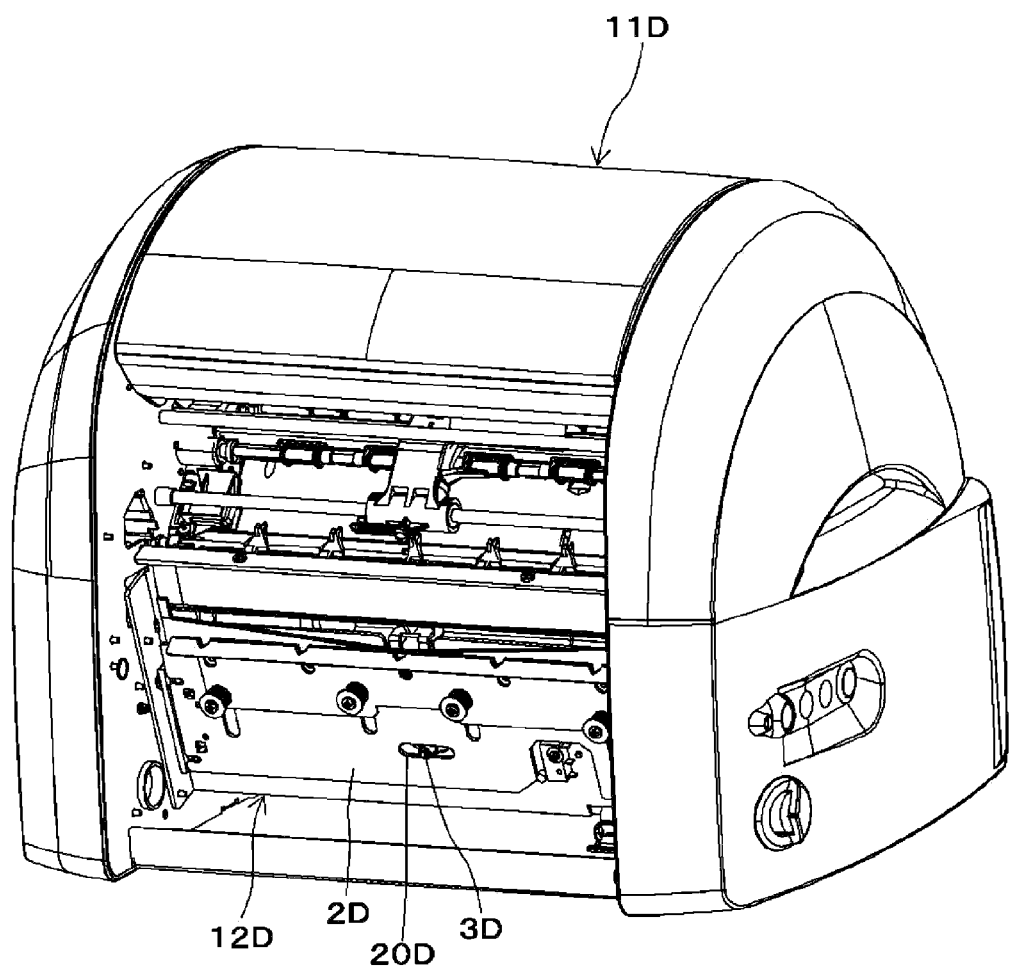
FIG. 6A is a side sectional view showing an example of an internal configuration of a printer as an embodiment of the device of the disclosure.
Figure 6B:
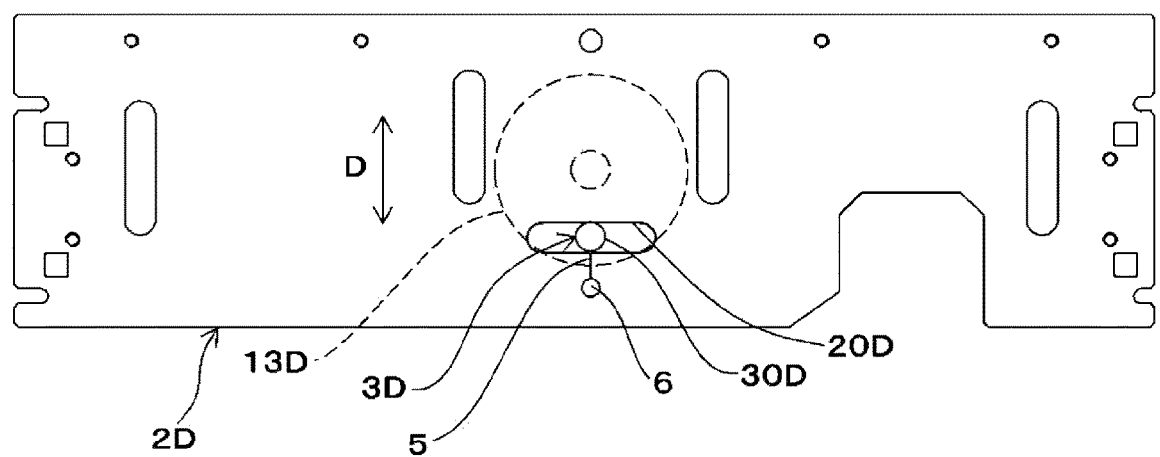
FIG. 6B is a plan view showing an example of a moving plate as a first member constituting the printer.
Figure 6C:
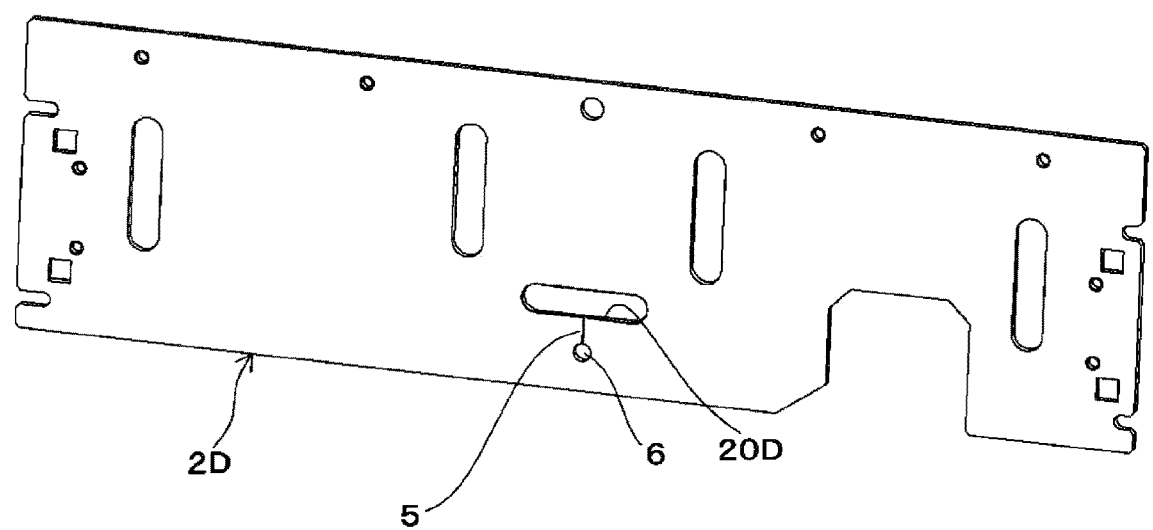
FIG. 6C is a perspective view showing an example of the moving plate as the first member constituting the printer.

FIG. 6A is a side sectional view showing an example of an internal configuration of a printer as an embodiment of the device of the disclosure, FIG. 6B is a plan view showing an example of a moving plate as the first member constituting the printer, and FIG. 6C is a perspective view showing an example of the moving plate as the first member constituting the printer. A printer 11D includes a cutter unit 12D for cutting an object to be printed, and a moving plate 2D for actuating the cutter unit 12D.

The moving plate 2D is attached to the cutter unit 12D to be able to reciprocate in a direction indicated by an arrow D. The moving plate 2D constitutes the first member and includes a cam surface 20D constituting the first surface. Further, the moving plate 2D includes the lubricant flow path 5 communicating with the cam surface 20D and the lubricant accommodating portion 6 communicating with the flow path 5.

The cutter unit 12D includes a cam follower 3D that moves along the cam surface 20D of the moving plate 2D. The cam follower 3D is an example of the second member, and a second surface 30D in contact with the cam surface 20D is formed on an outer periphery of a cylindrical shape of the cam follower 3D.

In the printer 11D, when the cam follower 3D is rotated by a rotating body 13D being driven, the cam surface 20D and the cam follower 3D rub against each other, and the moving plate 2D moves in the direction of the arrow D.

In the moving plate 2D, lubricant is supplied to the cam surface 20D on which the cam follower 3D rubs through the flow path 5. As a result, the wear of the cam surface 20D of the moving plate 2D and the cam follower 3D is suppressed.

What is claimed is:

1. A stapler, comprising:
   a first planar member being a cam shaped in a plate, the first planar member having a first surface which is a cam surface; and
   a second member having a second surface that forms an outer surface and is partially or wholly in contact with the first surface in a plate thickness direction of the first planar member, the second member being a cam follower,
   wherein the first member and the second member are configured to operate relatively,
   wherein a front surface of front and back surfaces of the first planar member is provided with a flow path of a lubricant connecting the first surface and configured by a concave groove that does not penetrate to the back surface,
   wherein one end of the flow path is provided with an opening that opens toward the first surface and recessed from the front surface,
   wherein an other end of the flow path communicates with an accommodating portion for the lubricant, and
   wherein the opening is provided on a downstream side of a changing point of the first surface that changes in a direction in which a distance from a portion in which the cam and the cam follower come into contact with each other to a shaft for the first planar member increases.

2. The stapler according to claim 1,
   wherein the opening is provided in a part of the first surface in a thickness direction of the first member intersecting with a direction in which the first member and the second member operate relatively.

3. The stapler according to claim 2,
   wherein the opening is provided on an upstream side of a portion where load is most applied in a range where the first surface and the second surface are in contact with each other when the first member and the second member operate relatively.

4. The stapler according to claim 2,
   wherein the first member has a plurality of flow paths that have openings in the first surface.

5. The stapler according to claim 2,
   wherein the flow path is provided on a surface different from the first surface of the first member.

6. The stapler according to claim 1,
   wherein the accommodating portion is provided on a surface different from the first surface.

7. The stapler according to claim 1,
   wherein the first member is configured to rotate with a shaft as a pivot point, and
   wherein the accommodating portion is provided at a portion where the load applied to the first member is low when the first member and the second member operate relatively.

8. The stapler according to claim 1,
   wherein volume of the accommodating portion is configured to be equal to or larger than volume of the flow path.

* * * * *